(12) United States Patent
Rahman

(10) Patent No.: US 12,302,139 B2
(45) Date of Patent: May 13, 2025

(54) METHOD TO PROVIDE RADIO BASE STATION PERFORMANCE MEASUREMENTS WITH ENHANCED GRANULARITY

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 344 days.

(21) Appl. No.: 17/680,997

(22) Filed: Feb. 25, 2022

(65) Prior Publication Data

US 2023/0276273 A1    Aug. 31, 2023

(51) Int. Cl.
*H04W 24/08*    (2009.01)
(52) U.S. Cl.
CPC .................................. *H04W 24/08* (2013.01)
(58) Field of Classification Search
None
See application file for complete search history.

(56) References Cited

U.S. PATENT DOCUMENTS

| | | | | |
|---|---|---|---|---|
| 2010/0238990 A1* | 9/2010 | Rao | ....................... | H04W 24/08 375/228 |
| 2011/0319062 A1* | 12/2011 | Markoulidakis | ...... | H04W 24/08 455/415 |
| 2013/0059577 A1* | 3/2013 | Zhao | ................... | H04L 41/0681 455/423 |
| 2020/0015154 A1* | 1/2020 | Pateromichelakis | . | H04W 92/10 |
| 2021/0056487 A1* | 2/2021 | Boyle | ................ | H04L 41/0631 |
| 2023/0138595 A1* | 5/2023 | Song | ..................... | H04W 24/08 370/252 |
| 2023/0284058 A1* | 9/2023 | Eklöf | ................... | H04W 24/08 370/252 |

FOREIGN PATENT DOCUMENTS

WO    WO-2022240687 A1 *  11/2022

* cited by examiner

*Primary Examiner* — Benjamin Lamont
(74) *Attorney, Agent, or Firm* — SHOOK, HARDY & BACON L.L.P.; Elena K. McFarland

(57) ABSTRACT

Systems and methods are provided for enhancing radio base station performance measurements with additional granularity. Radio base station key performance indicators (KPIs) are provided that may be broken down by user equipment (UE) type or model, public land mobile network (PLMN) identification (ID), service type, and the like. To do so, the attributes in radio resource control (RRC) messages between UEs & 4G/5G base stations (i.e., an eNodeB or a gNodeB) can be leveraged to define key flags from different signaling steps and enrich KPI pegging. The key flags from the various RRC signaling steps can be used by counters, at the base station, to identify various key service and network level KPI metrics based on UE type or model, PLMN ID, service type, and the like.

20 Claims, 4 Drawing Sheets

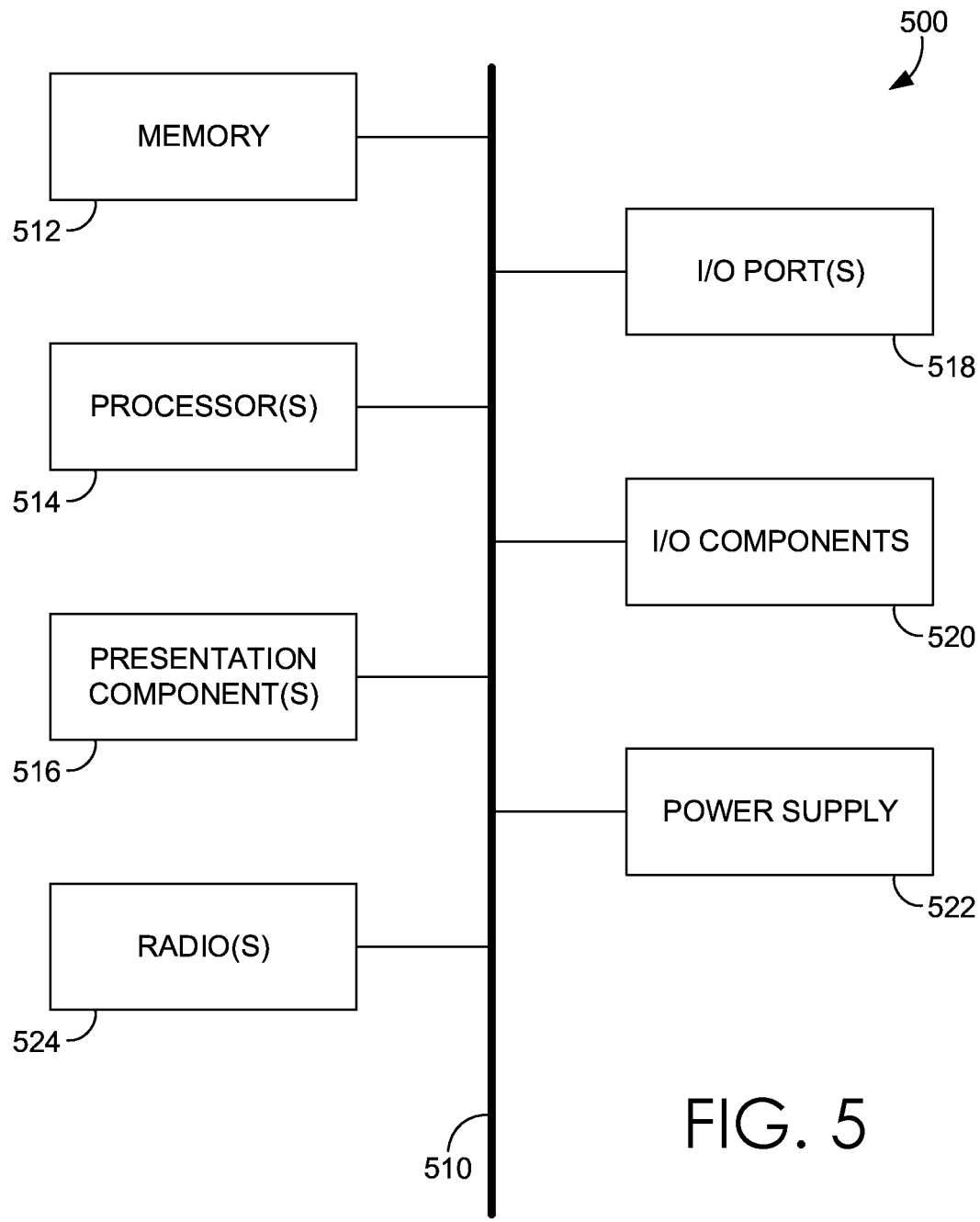

METHOD TO PROVIDE RADIO BASE STATION PERFORMANCE MEASUREMENTS WITH ENHANCED GRANULARITY

SUMMARY

Embodiments of the technology described herein are directed to, among other things, systems and methods for providing radio base station performance measurements with enhanced granularity. More particularly, embodiments of the technology described herein provide radio base station key performance indicators (KPIs) that may be broken down by user equipment (UE) type or model, public land mobile network (PLMN) identification (ID), service type, and the like.

By leveraging the attributes in radio resource control (RRC) messages between UEs & 4G/5G base stations (i.e., an eNodeB or a gNodeB), key flags from different signaling steps can be identified and utilized to enrich KPI pegging. For example, base station equipment, regardless of vendor, comes with various performance registers known as counters. The key flags from the various RRC signaling steps can be used by counters, at the base station, to identify various key service and network level KPI metrics based on UE type or model, PLMN ID, service type, and the like. In doing so, the mobile operator benefits from the enhanced granularity at the base station level.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present technology are described in detail herein with reference to the attached figures, which are intended to be exemplary and non-limiting, wherein:

FIG. 5 depicts an example computing environment suitable for use in implementation of the present disclosure.

DETAILED DESCRIPTION

Figure 1:
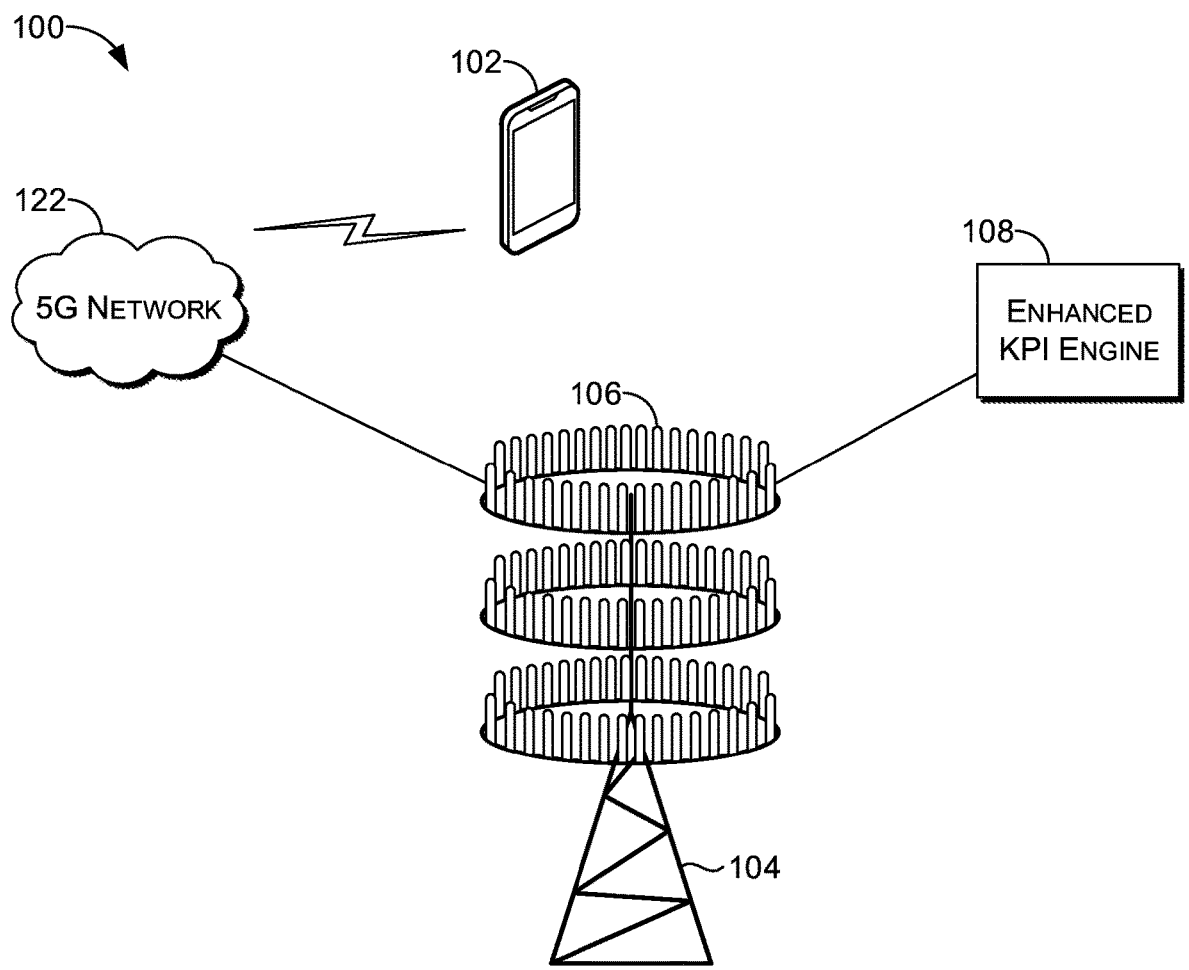
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
BRS Broadband Radio Service
CD-ROM Compact Disk Read Only Memory
CDMA Code Division Multiple Access
EIRP Equivalent Isotropically Radiated Power
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
MIMO Multiple-Input Multiple-Output
mMIMO Massive Multiple-Input Multiple-Output
MMU Massive Multiple-Input Multiple-Output Unit
NEXRAD Next-Generation Radar
NR New Radio
NSA Nonstandalone
OOBE Out-of-Band-Emission
PC Personal Computer
PCS Personal Communications Service
PDA Personal Digital Assistant
RAM Random Access Memory
RAT Radio Access Technology
RET Remote Electrical Tilt
RF Radio-Frequency
RFI Radio-Frequency Interference
R/N Relay Node
RNR Reverse Noise Rise
ROM Read Only Memory
RRU Remote Radio Unit
RSRP Reference Transmission Receive Power
RSRQ Reference Transmission Receive Quality
RSSI Received Transmission Strength Indicator
SA Standalone
SINR Signal-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, mMIMO/5G, and the like); however, in other aspects, a single access point may communicate with a UE according to multiple protocols. As used herein, a base station may comprise one access point or more than one access point. Factors that can affect the telecommunications transmission include, e.g., location and size of the base stations, frequency of the transmission, among other factors.

A UE or a WCD can include any device employed by an end-user to communicate with a wireless telecommunications network. A WCD can include a mobile device, a mobile broadband adapter, or any other communications device employed to communicate with the wireless telecommunications network. A WCD, as one of ordinary skill in the art may appreciate, generally includes one or more antenna coupled to a radio for exchanging (e.g., transmitting and receiving) transmissions with a nearby base station.

The present disclosure is directed to systems, methods, and computer readable media that enhance radio base station performance measurements with additional granularity. Radio base station KPIs are provided that may be broken down by UE type or model, PLMN ID, service type, and the like. To do so, the attributes in RRC messages between UEs & 4G/5G base stations (i.e., an eNodeB or a gNodeB) can be leveraged to define key flags from different signaling steps and enrich KPI pegging. For example, base station equipment, regardless of vendor, comes with various performance registers known as counters. The key flags from the various RRC signaling steps can be used by counters, at the base station, to identify UE type or model, PLMN ID, service type, and the like. In doing so, the mobile operator benefits from the enhanced granularity for various key service and network level KPI metrics at the base station level.

According to aspects of the technology described herein, a method for providing radio base station performance measurements with enhanced granularity is provided. The method comprises receiving, in one or more fields of a radio resource control (RRC) message, at a gNodeB, attributes corresponding to a user equipment (UE) initiating the RRC message. The attributes comprise one or more of: an international mobile equipment identity (IMEI), a public land mobile network (PLMN) identification (ID), or a service type. The method also comprises associating, at the gNodeB, the attributes to key performance indicators (KPIs) corresponding to the user equipment. The method further comprises providing, by the gNodeB, the KPIs per attribute of the attributes.

According to further aspects of the technology described herein, one or more computer-readable media having computer-executable instructions embodied thereon that, when executed by at least one computing device, cause the computing device to perform operations for providing radio base station performance measurements with enhanced granularity. The operations comprise receiving, in one or more fields of a RRC message, at a gNodeB, attributes corresponding to a UE initiating the RRC message. The attributes comprise one or more of: an IMEI, PLMN ID, or a service type. The operations also comprise associating, at the gNodeB, the attributes to KPIs corresponding to the user equipment. The operations further comprise providing, by the gNodeB, the KPIs per attribute of the attributes.

According to even further aspects of the technology described herein, a system for providing radio base station performance measurements with enhanced granularity. The system comprises one or more UEs and a node configured to wirelessly communicate with the one or more UEs. The node is configured to receive, in one or more fields of a RRC message, attributes corresponding to a UE of the one or more UEs initiating the RRC message. The attributes comprise one or more of: an IMEI, a PLMN ID, or a service type. The node is also configured to associate the attributes to KPIs corresponding to the UE. The node is further configured to provide the KPIs per attribute of the attributes.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

A network cell may comprise a base station to facilitate wireless communication between a communications device within the network cell, such as communications device 500 described with respect to FIG. 5, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 512 in FIG. 5 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include an Enhanced KPI Engine 108. The Enhanced KPI Engine 108 may be configured to, among other things, providing radio base station performance measurements with enhanced granularity, in accordance with the present disclosure. Though Enhanced KPI Engine 108 is illustrated as a component of base station 104 in FIG. 1, it may be a standalone device (e.g., a server having one or more processors), a component of the UE 102, a service provided via the 5G network 122, or may be remotely located.

Figure 2:
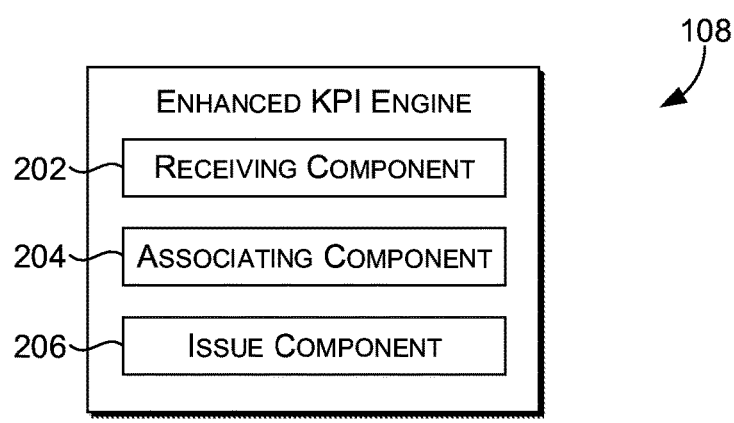
FIG. 2 illustrates a diagram of an enhanced KPI engine, in accordance with aspects herein.

Referring now to FIG. 2, the Enhanced KPI Engine 108 may include, among other things, receiving component 202, associating component 204, and issue component 206. The Enhanced KPI Engine 108 may receive, among other things, data from user devices, such as UE 102, within a network cell associated with a particular base station 104. For example, the Enhanced KPI Engine 108 may receive, among other things, RRC messages from UEs, such as UE 102. For clarity, RRC is a layer 3 protocol used between UEs and base stations. The RRC protocol is specified by 3rd Generation Partnership Project (3GPP) in Technical Specification (TS) 25.331 for Universal Mobile Telecommunications System (UMTS), in TS 36.331 for Long-Term Evolution (LTE), and in TS 38.331 for 5G New Radio. RRC messages are transported via the Packet Data Convergence Protocol (PDCP).

RRC messages can be leveraged to provide various functions, including connection establishment and release, broadcast of system information, radio bearer establishment, reconfiguration and release, RRC connection mobility procedures, and paging notification and release. The operation of the RRC is guided by a state machine that defines states of the UE. For example, based on the various states of the state machine, different radio resources are allocated to the UE when in a specific state. Consequently, the state machine may influence the quality of the service the user experiences as well as the energy consumed by the UE.

In aspects, the Enhanced KPI Engine 108 enables one or more new fields to be created in an RRC message. In various aspects, the Enhanced KPI Engine 108 may further enable the new fields to be defined at the gNodeB and/or the UE (such as by the manufacture of the gNodeB and/or the UE). As such, during normal RRC messaging flow between the gNodeB and the UE, the gNodeB and the UE are able to understand the information provided in the new fields. For example, the Enhanced KPI Engine 108 may enable fields corresponding to the IMEI, the PLMN ID, and/or the service type to be created and defined at the gNodeB and/or the UE. Accordingly, data communicated in these new fields may be understood by both the gNodeB and the UE.

Receiving component 202 generally receives, in one or more fields of a RRC message, attributes corresponding to a UE initiating the RCC message. The attributes comprise one or more of: an IMEI, a PLMN ID, or a service type. The attributes corresponding to the UE may be identified at one or more counters or registers of the gNodeB.

Associating component 204 generally associates the attributes to KPIs corresponding to the user equipment. As can be appreciated, this provides additional insight to the gNodeB of the UE involved in the particular RRC messaging flow. Moreover, this enables the gNodeB to provide the KPIs per attribute of the attributes. In other words, the gNodeB is able to associate and provide KPIs based on an aspect provided by the IMEI (e.g., device type), based on the PLMN ID, or based on the service type. As the KPIs indicate an issue, at the base station level, the network operator is able to quickly ascertain what is causing the issue (i.e., the device type, the PLMN ID, the service type, etc.).

In some aspects, issue component 206 generally detects an issue within a radio network provided by the gNodeB. The issue component 206 may further determine the issue corresponds to a particular attribute of the attributes. For example, the issue may correspond to a particular device type as indicated by the IMEI, or to a particular PLMN ID, or to a particular service type, etc. Accordingly, the issue component 206 may provide an alert to an operator of the gNodeB indicating the issue is being caused by the particular attribute.

Figure 3:
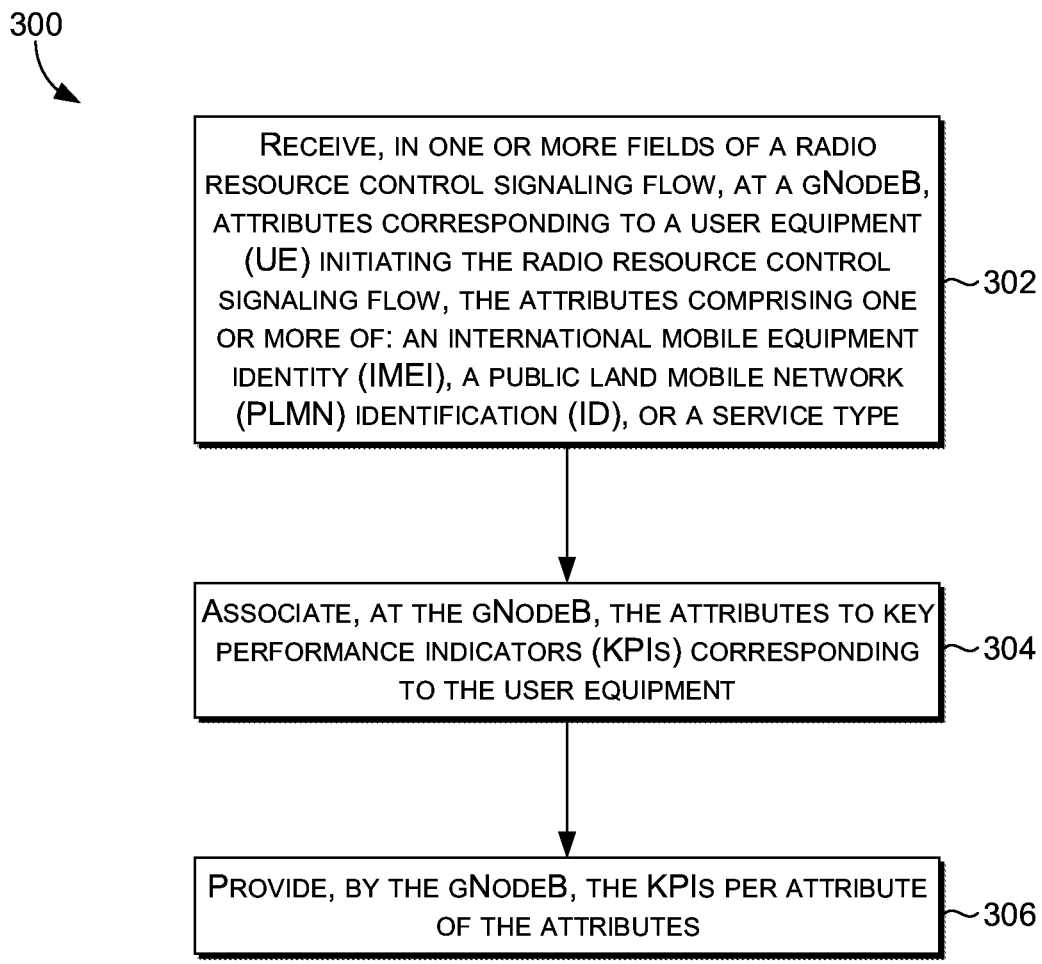
FIG. 3 is a flow diagram of an example method for providing radio base station performance measurements with enhanced granularity, in accordance with some aspects of the technology described herein.

Turning to FIG. 3, a flow diagram is provided depicting a method 300 for providing radio base station performance measurements with enhanced granularity, according to aspects of the technology described herein. Initially, at step 302, attributes corresponding to a UE initiating an RCC message are received, at a gNodeB, in one or more fields of the RRC message. The attributes may comprise one or more of: an IMEI, a PLMN ID, or a service type.

At step 304, the attributes are associated, at the gNodeB, to key performance indicators (KPIs) corresponding to the user equipment. In some aspects, one or more fields of the RRC message are defined at the gNodeB. Additionally or alternatively, in some aspects, the one or more fields of the RRC message are defined at the UE. In this way, the gNodeB and the UE are able to communicate various information corresponding to the attributes in the one or more fields of the RRC message. Accordingly, the attributes corresponding to the UE may be identified at one or more counters of the gNodeB. Moreover, this enables the gNodeB to associate or classify the attributes with the KPIs.

At step 306, the KPIs are provided, by the gNodeB, per attribute of the attributes. Using the classification provided by the attributes (e.g., IMEI, PLMN ID, service type, and the like), the gNodeB is able to provide KPIs with enhanced granularity. For example, the gNodeB can provide KPIs per UE type, per PLMN ID, or per service type. In this way, if the KPIs indicate a performance degradation, the gNodeB is able to quickly ascertain whether a particular UE, PLMN ID, or service is responsible.

Figure 4:
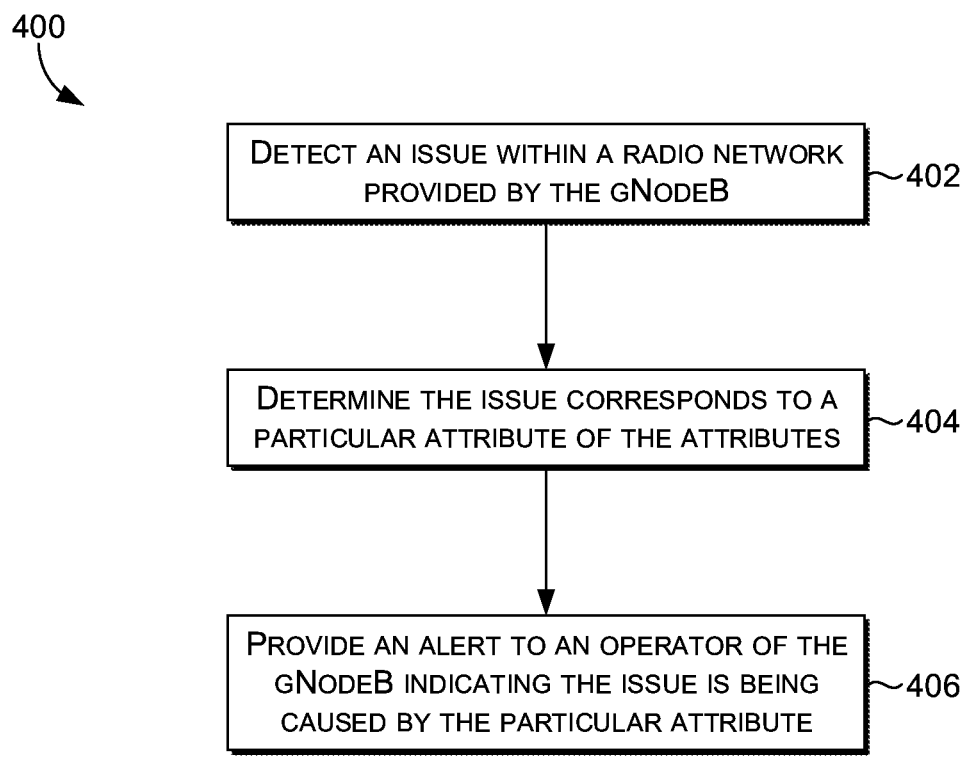
FIG. 4 is a flow diagram of an example method for detecting an issue within a radio network and providing an alert indicating the issue is being caused by a particular attribute, in accordance with some aspects of the technology described herein.

Referring to FIG. 4, a flow diagram is provided depicting a method for detecting an issue within a radio network and providing an alert indicating the issue is being caused by a particular attribute, according to aspects of the technology described herein. Initially, at step 402, an issue is detected within a radio network provided by the gNodeB.

At step 404, it is determined the issue corresponds to a particular attribute of the attributes. For example the issue may correspond to a particular device type or version of a device type. In another example, the issue may correspond to a particular PLMN ID. In yet another example, the issue may correspond to a particular service type, such as data or voice.

At step 406, an alert is provided to an operator of the gNodeB indicating the issue is being caused by the particular attribute. In this way, an alert may be provided to an operator of the gNodeB indicating the issue is being caused by the particular attribute. In contrast to conventional systems that require extensive data analysis at the core network level, the network operator is able to quickly ascertain the potential cause of the issue, at the base station level.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 5, a block diagram of an exemplary computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. It should be noted that although some components in FIG. 5 are shown in the singular, they may be plural. For example, the computing device 500 might include multiple processors or multiple radios. In aspects, the computing device 500 may be a UE/WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 510 that directly or indirectly couples various components together, including memory 512, processor(s) 514, presentation component(s) 516 (if applicable), radio(s) 524, input/output (I/O) port(s) 518, input/output (I/O) component(s) 520, and power supply(s) 522. Although the components of FIG. 5 are shown with lines for the sake of clarity, in reality, delineating various components is not so clear, and metaphorically, the lines would more accurately be grey and fuzzy. For example, one may consider a presentation component such as a display device to be one of I/O components 520. Also, processors, such as one or more processors 514, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 512 may take the form of memory components described herein. Thus, further elaboration will not be provided here, but it should be noted that memory 512 may include any type of tangible medium that is capable of storing information, such as a database. A database may be any collection of records, data, and/or information. In one embodiment, memory 512 may include a set of embodied computer-executable instructions that, when executed, facilitate various functions or elements disclosed herein. These embodied instructions will variously be referred to as "instructions" or an "application" for short.

Processor 514 may actually be multiple processors that receive instructions and process them accordingly. Presentation component 516 may include a display, a speaker, and/or other components that may present information (e.g., a display, a screen, a lamp (LED), a graphical user interface (GUI), and/or even lighted keyboards) through visual, auditory, and/or other tactile cues.

Radio 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 524 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 518 may take a variety of forms. Exemplary I/O ports may include a USB jack, a stereo jack, an infrared port, a firewire port, other proprietary communications ports, and the like. Input/output (I/O) components 520 may comprise keyboards, microphones, speakers, touchscreens, and/or any other item usable to directly or indirectly input data into the computing device 500.

Power supply 522 may include batteries, fuel cells, and/or any other component that may act as a power source to supply power to the computing device 500 or to other network components, including through one or more electrical connections or couplings. Power supply 522 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method for providing radio base station performance measurements with enhanced granularity, the method comprising:
   receiving, in one or more fields of a radio resource control (RRC) message, at a gNodeB, attributes corresponding to a user equipment (UE) initiating the RRC message, the attributes comprising an international mobile equipment identity (IMEI);
   associating, at the gNodeB, the attributes to key performance indicators (KPIs) corresponding to the UE;
   providing, by the gNodeB, the KPIs per UE type; and
   determining, by the gNodeB, a particular UE type is responsible for performance degradation based on the UE type.

2. The method of claim 1, wherein the one or more fields of the RRC message are defined at the gNodeB.

3. The method of claim 2, wherein the one or more fields of the RRC message are defined at the UE.

4. The method of claim 1, further comprising identifying at one or more counters of the gNodeB, attributes corresponding to the UE.

5. The method of claim 1, further comprising detecting an issue within a radio network provided by the gNodeB.

6. The method of claim 5, further comprising determining the issue corresponds to a particular attribute of the attributes.

7. The method of claim 6, further comprising, providing an alert to an operator of the gNodeB indicating the issue is being caused by the particular attribute.

8. One or more computer-readable media having computer-executable instructions embodied thereon that, when executed by at least one computing device, cause the computing device to perform operations for providing radio base station performance measurements with enhanced granularity, the operations comprising:
receiving, in one or more fields of a radio resource control (RRC) message, at a gNodeB, attributes corresponding to a user equipment (UE) initiating the RRC message, the attributes comprising one or more of: an international mobile equipment identity (IMEI);
associating, at the gNodeB, the attributes to key performance indicators (KPIs) corresponding to the UE;
providing, by the gNodeB, the KPIs per UE type; and
determining, by the gNodeB, a particular UE type is responsible for performance degradation based on the UE type.

9. The one or more computer-readable media of claim 8, wherein the one or more fields of the RRC message are defined at the gNodeB.

10. The one or more computer-readable media of claim 9, wherein the one or more fields of the RRC message are defined at the UE.

11. The one or more computer-readable media of claim 8, further comprising identifying at one or more counters of the gNodeB, attributes corresponding to the UE.

12. The one or more computer-readable media of claim 8, further comprising detecting an issue within a radio network provided by the gNodeB.

13. The one or more computer-readable media of claim 12, further comprising determining the issue corresponds to a particular attribute of the attributes.

14. The one or more computer-readable media of claim 13, further comprising, providing an alert to an operator of the gNodeB indicating the issue is being caused by the particular attribute.

15. A system for providing radio base station performance measurements with enhanced granularity, the system comprising:
one or more UEs (user equipment); and
a node configured to wirelessly communicate with the one or more UEs, wherein the node is configured to:
receive, in one or more fields of a radio resource control (RRC) message, attributes corresponding to a UE of the one or more UEs initiating the RRC message, the attributes comprising an international mobile equipment identity (IMEI);
associate the attributes to key performance indicators (KPIs) corresponding to the UE;
provide the KPIs per UE type; and
determine a particular UE type is responsible for performance degradation based on the UE type.

16. The system of claim 15, wherein the one or more fields of the RRC message are defined at the node and the one or more UEs.

17. The system of claim 15, further comprising identifying at one or more counters of the node, attributes corresponding to the UE.

18. The system of claim 15, further comprising detecting an issue within a radio network provided by the node.

19. The system of claim 18, further comprising determining the issue corresponds to a particular attribute of the attributes.

20. The system of claim 19, further comprising, providing an alert to an operator of the node indicating the issue is being caused by the particular attribute.

* * * * *